(12) United States Patent
Sergey et al.

(10) Patent No.: US 8,179,772 B2
(45) Date of Patent: May 15, 2012

(54) DATA STORAGE MEDIUM AND METHOD FOR SCANNING A STORAGE MEDIUM

(75) Inventors: Boldyrev Sergey, Helsinki (FI); Vladimir Ermolov, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/663,877

(22) PCT Filed: Jun. 26, 2007

(86) PCT No.: PCT/IB2007/052473
§ 371 (c)(1),
(2), (4) Date: Dec. 10, 2009

(87) PCT Pub. No.: WO2009/001172
PCT Pub. Date: Dec. 31, 2008

(65) Prior Publication Data
US 2010/0182892 A1    Jul. 22, 2010

(51) Int. Cl.
*G11B 7/00*    (2006.01)
(52) U.S. Cl. ........................................ 369/126
(58) Field of Classification Search ................. 369/101, 369/126, 275.3, 44.27, 44.28, 44.26
See application file for complete search history.

(56) References Cited

U.S. PATENT DOCUMENTS

| | | | |
|---|---|---|---|
| 5,394,388 A | 2/1995 | Hatanaka et al. | 369/126 |
| 7,382,712 B2 * | 6/2008 | Cherubini et al. | 369/126 |
| 7,436,748 B2 * | 10/2008 | Cherubini et al. | 369/101 |
| 7,852,739 B2 * | 12/2010 | Koga et al. | 369/126 |
| 2005/0013230 A1 | 1/2005 | Adelmann | 369/101 |
| 2006/0083152 A1 | 4/2006 | Albrecht | 369/126 |
| 2006/0187803 A1 | 8/2006 | Baechtold et al. | 369/126 |

FOREIGN PATENT DOCUMENTS

| | | |
|---|---|---|
| EP | 0 869 489 A2 | 10/1998 |
| EP | 1 365 395 A2 | 11/2003 |
| EP | 1 385 161 A2 | 1/2004 |
| GB | 2 405 027 A | 2/2005 |

* cited by examiner

*Primary Examiner* — Nabil Hindi
(74) *Attorney, Agent, or Firm* — Harrington & Smith

(57) ABSTRACT

A data storage medium stories data in the form of marks, said marks being written and/or read by an array of probes. The storage medium further includes a plurality of data fields, each field including an area of the storage medium which, in use, is scanned for reading and/or writing by an associated one of the array of probes. The data fields include operational data fields having operational data for operating said scanning stored dierein, wherein the operational data fields are arranged in a plurality of clusters, each cluster including a plurality of adjacent operational data fields. The invention also provides a method of scanning the data storage medium with the probe array, in which a target data field is determined and an operational data cluster closest to the target data field is selected and the operational data stored therein is used to control parameters of the scanning.

21 Claims, 10 Drawing Sheets

DATA STORAGE MEDIUM AND METHOD FOR SCANNING A STORAGE MEDIUM

FIELD OF THE INVENTION

The present invention relates to a storage medium for storing data in the form of marks, said marks being written and/or read by a probe array and to a method of scanning the storage medium using a probe array.

BACKGROUND TO THE INVENTION

There is an increasing requirement in data and multimedia services for more and more local memory in hand-held or mobile devices. Presently, flash memories are the memory type typically used in mobile terminals such as mobile telecommunications devices. As data requirements increase, progress has been made to increase the capacity and decrease the cost of flash memories. However, there is still a need for a data storage medium having low cost, high storage density and high access speed.

Recently, probe storage systems have been developed. Probe storage utilises atomic force microscopy probes having tips which are heated so that when they make contact with a polymer surface of a recording medium, the heated tip softens the polymer surface and creates an indentation or "pit" in the polymer surface.

The probes are used for reading by exploiting the temperature dependent resistance of the probes. The probes are heated to a temperature lower than that required to melt the polymer. When the probe travels into a pit the heat transfer between the polymer and the probe is more efficient and the probe's temperature and hence resistance will decrease. The decrease in resistance is detected to detect the presence of the pit.

More recently developed probe storage devices, such as those shown in US 2003/0218960 or US 2004/0047275 use a storage medium and a probe array, wherein either the storage medium or the probe array is scanned in an x-y scanning directions. For example, the storage medium may be spring-mounted and can be pulled in the x and y direction by actuators on each edge. The storage medium moves below a two-dimensional array of fixed read/write probes. To access data, the medium is first pulled to a specified location. In addition, a feedback controlled z approaching scheme brings the probe array into contact with the storage medium. This contact is maintained and controlled while x-y scanning is performed for read/write. The array of probes, which may comprise thousands of probes, work simultaneously and each probe writes and reads information in its defined area. The probes thus scan their associated fields of the storage medium in parallel so that high data rates can be achieved. Already, such probe storage prototypes are demonstrating storage density as high as 3 Tb/inch$^2$.

For performing accurate scanning of the recording medium, various types of operational data are required to be recorded on the recording medium. One type of operational data are servo marks patterns which are stored at certain locations on the probe storage medium to allow positioning and tracking of the probes during scanning. US 2003/0218960 discloses a method for scanning the storage media using a probe array, in which a servo mark pattern is located on the recording medium as shown in FIGS. 10 and 11. Four different types of patterns A, B, C and D are arranged on the probe storage medium as shown in FIGS. 10 and 11, either at intervals along one edge (FIG. 10) or equally spaced in a two dimensional grid (FIG. 11).

US 2004/0047275 discloses the use of a further type of operational data, being timing data used to adjust a clock used in the scanning. According to US 2004/0047275, for reasons of power conservation, periodic current or voltage pulses at short duration are applied to the probes, rather than DC current or voltage, for writing or reading. Accurate timing of the pulses is critical so that, for instance in reading, the pulses occur when the probes coincide with the centres of pits. Also, in the writing of data, the timing of writing pulses is important when writing to an "empty" or blank storage medium, but also when erasing a "dirty" or previously used medium. In an erasing operation, timing is important to time when pulses occur in order to melt out an indentation. Therefore, a reference clock pattern and a calibration field are used to correct the pulse frequency. The calibration field includes calibration data and the reference clock pattern is a pattern which is oversampled to adjust the clock frequency. FIG. 12 shows how the reference clock field and the calibration field are located in a corner of the storage medium in US 2004/0047275.

However, as shown in FIG. 13, forces applied to the storage media by the actuators cause distortion of the storage medium. This causes problems with the reading of the operational data and the accuracy of various calibrations carried out based on the reading of the operational data. For instance, if a target field for reading/writing data is located far away from the servo marks, then tracking will not be accurate based on the reading of the servo marks due to distortion of the storage media. Furthermore, if several fields of servo marks are used (A, B, C and D in FIGS. 10 and 11) which are spaced from each other, then distortion of the medium will affect the tracking or positioning accuracy.

Furthermore, the system may not detect or recognise servo marks or reference clock marks that are located at further distances from the media drivers because of location errors due to the distortion. With respect to the reference clock marks, there will be a higher probability of mismatch of position of reference clock and data marks where the data marks are further from the reference clock marks and further from the media drivers. Also, there will be a greater probability of non-detection of reference clock marks if these are located further from the servo marks.

SUMMARY OF THE INVENTION

The present invention provides a data storage medium for storing data in the form of marks, said marks being written and/or read by an array of probes, comprising:
  a plurality of data fields, each field comprising an area of the storage medium which, in use, is scanned for reading and/or writing by an associated one of the array of probes;
  wherein the data fields include operational data fields having operational data for operating said scanning stored therein;
  wherein the operational data fields are arranged in a plurality of clusters, each cluster comprising a plurality of adjacent operational data fields having operational data stored therein, at least one of which comprises a servo data field having servo data stored therein for determining positioning of the probe array during scanning, and at least one of which comprises a timing data field having timing data stored therein for determining timing of read and/or write pulses during scanning.

Preferably, one of the clusters is located substantially in the geometric centre of the data storage medium. Preferably, one of the clusters is located at each corner of the data storage medium. Preferably, each cluster comprises at least three operational data fields.

Preferably, the operational data stored in each of the operational data fields in each cluster is different. Preferably, each cluster comprises four different servo mark patterns, each stored in a different operational data field.

Preferably, the storage medium comprises a polymer surface and the marks are indentations. Preferably, the reading/writing of the marks is performed thermomechanically.

Preferably, each cluster comprises two timing data fields, having a clock mark pattern and calibration data respectively stored therein, for adjusting a clock used to read/write data.

The present invention also provides a data storage device including the storage medium and a probe array, wherein each probe in the array is configured to scan an associated one of the data fields for reading/writing data. Preferably, the data storage device further comprises actuators for relatively moving the probe array and the storage medium in an x-y direction to perform scanning. Preferably, the actuators are configured to move the storage medium relative to the probe array.

Preferably, the data storage device according to further comprises a controller configured to control the scanning operation in response to reading of the operational data. Preferably, the controller is configured to control movement of the probe array in response to reading the servo data, and to control a clock used for providing a pulsed reading/writing signal in response to reading the timing data.

The present invention further provides a method of scanning a data storage medium with a probe array comprising:
  determining a target data field out of a plurality of data fields on the data storage medium, wherein each data field is an area of the storage medium which is scanned by an associated probe of the probe array;
  selecting from a plurality of operational data clusters, an operational data cluster closest to the target data field, each operational data cluster comprising a plurality of adjacent data fields having operational data stored therein at least one of which comprises a servo data field having servo data stored therein, and at least one of which comprises a timing data field having timing data stored therein;
  controlling positioning of the probe array during scanning using the servo data; and
  controlling timing of read and/or write pulses during scanning using the timing data.

Preferably, each cluster comprises a plurality of servo data fields, each servo data field in the cluster comprising a different pattern of servo marks, wherein the method comprises performing a tracking operation by simultaneously reading the servo marks patterns in the servo data fields of the selected cluster.

The present invention further provides a data storage medium for storing data in the form of marks, said marks being written and/or read by an array of probes, comprising:
  a plurality of data fields, each field comprising an area of the storage medium which, in use, is scanned for reading and/or writing by an associated one of the array of probes;
  wherein the data fields include operational data fields having operational data for operating said scanning stored therein;
  wherein the operational data fields are arranged in a plurality of clusters, each cluster comprising a plurality of adjacent operational data fields, the operational data fields including a plurality of servo data fields wherein the operational data is servo data, and wherein each servo data field in a cluster comprises a different pattern of servo marks, which can be read simultaneously to perform a tracking operation.

Preferably, each cluster comprises at least four servo data fields, each comprising a different pattern of servo marks, which can be read simultaneously to perform a tracking operation.

Preferably, one of the clusters is located substantially in the geometric centre of the data storage medium and one of the clusters is located at each corner of the data storage medium.

Preferably, the storage medium comprises a polymer surface and the marks are indentations. Preferably, the reading/writing of the marks is performed thermomechanically.

Preferably, each cluster further comprises two timing data fields comprising a clock mark pattern and calibration data respectively for adjusting a clock used to read/write data.

The present invention further provides a data storage device comprising the storage medium and a probe array, wherein each probe in the array is configured to scan an associated one of the data fields for reading/writing data. Preferably, the data storage device further comprises actuators for relatively moving the storage medium in an x-y direction to perform scanning. Preferably, the data storage device further comprises a controller configured to control the scanning operation in response to reading of the operational data. Preferably, the controller is configured to control movement of the actuators in response to reading of the servo data, and to control a clock used for providing a pulsed reading/writing signal in response to reading the timing data.

The present invention also provides a method of scanning a data storage medium with a probe array comprising:
  determining a target data field out of a plurality of data fields on the data storage medium, wherein each data field is an area of the storage medium which is scanned by an associated probe of the probe array;
  selecting from a plurality of operational data clusters, an operational data cluster closest to the target data field, each operational data cluster comprising a plurality of adjacent data fields having operational data stored therein, the operational data fields including a plurality of servo data fields wherein the operational data is servo data, and wherein each servo data field in a cluster comprises a different pattern of servo marks;
  simultaneously reading the servo data fields of the selected cluster; and
  performing a tracking operation based on the reading of the servo data.

Preferably, each cluster comprises four servo data fields, each comprising a different pattern of servo marks, and the method comprises performing a tracking operation by simultaneously reading the servo marks patterns in the four servo data fields of the selected cluster.

BRIEF DESCRIPTION OF THE DRAWINGS

Embodiments of the present invention will now be described in detail with reference to accompanying drawings, in which.

DETAILED DESCRIPTION

Figure 1:
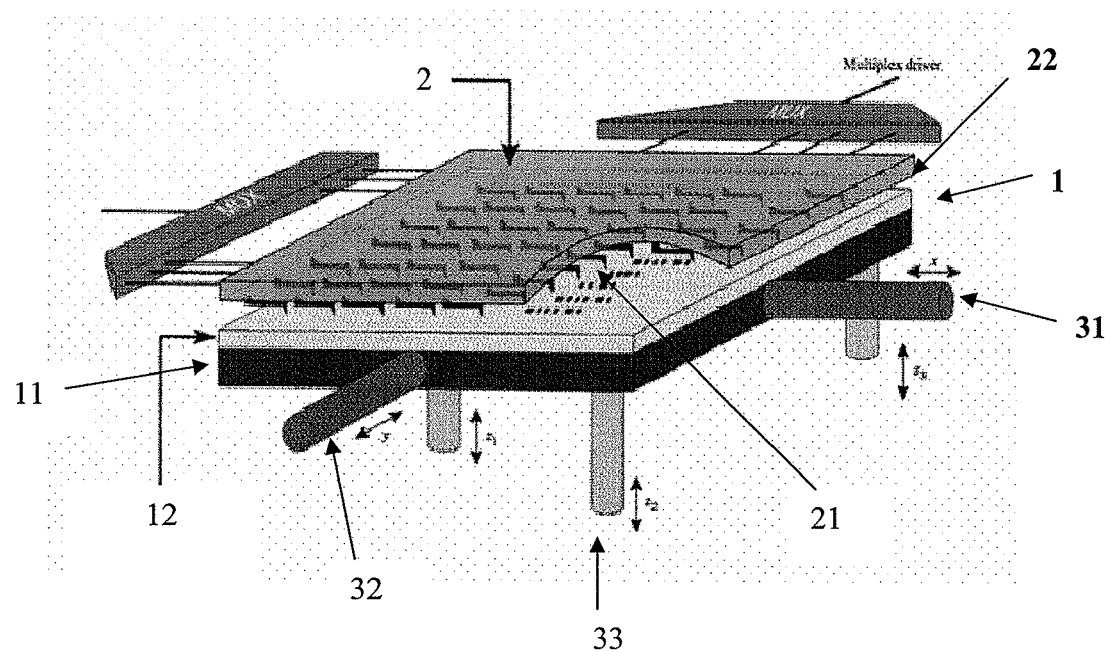
FIG. 1 is a perspective view of a storage device in accordance with the present invention.

FIG. 1 is a perspective view of a storage device including a storage medium 1 according to the present invention. The storage device includes the storage medium 1 and a probe array 2 comprising a plurality of probes 21 arranged in a two-dimensional array and mounted on a support 22. The storage medium 1 comprises a substrate 11 and a polymer layer 12 forming a recording surface of the storage medium 1. The storage medium 1 is mounted such that it is movable in the x, y and z directions when a force is applied by actuators 31, 32 and 33 respectively.

Figure 2:
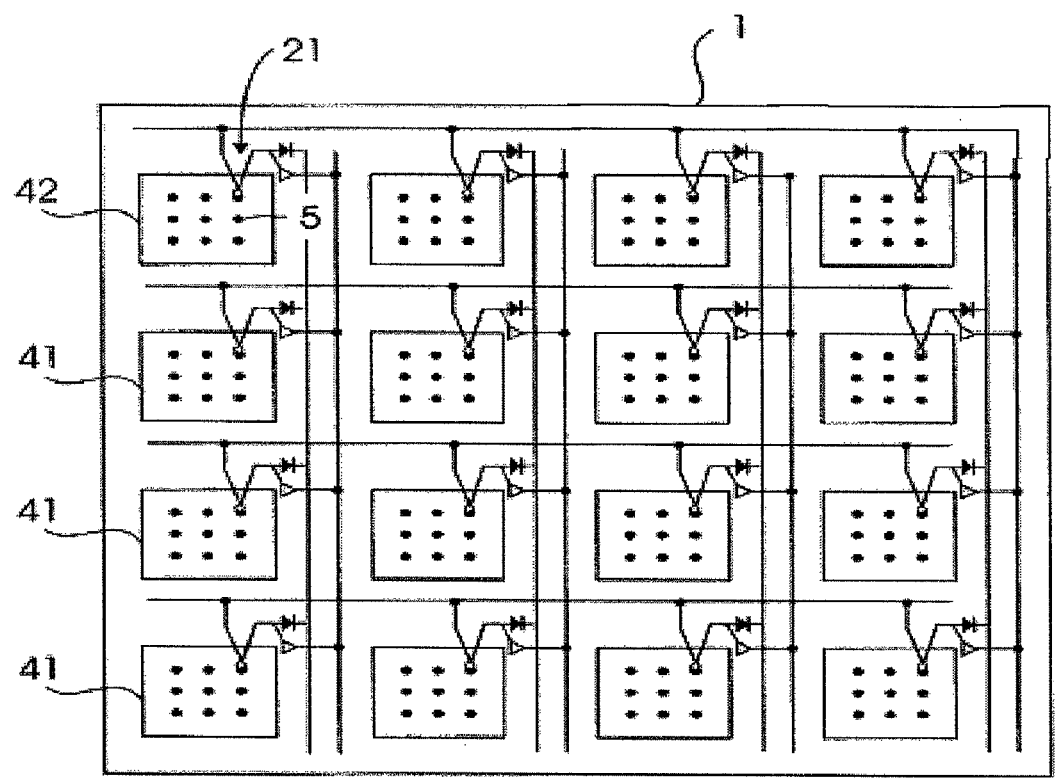
FIG. 2 is a top view of a storage medium in accordance with the present invention with an illustrative probe array.

FIG. 2 is a top view illustrating schematically the probe array 2 and the surface of the storage medium 1. As the probe array 2 scans in the x and y direction, each probe 21 scans an associated data field 41. Each probe 21 exclusively scans its own associated data field 41 such that all of the data fields 41 can be scanned simultaneously in parallel.

Figure 3:
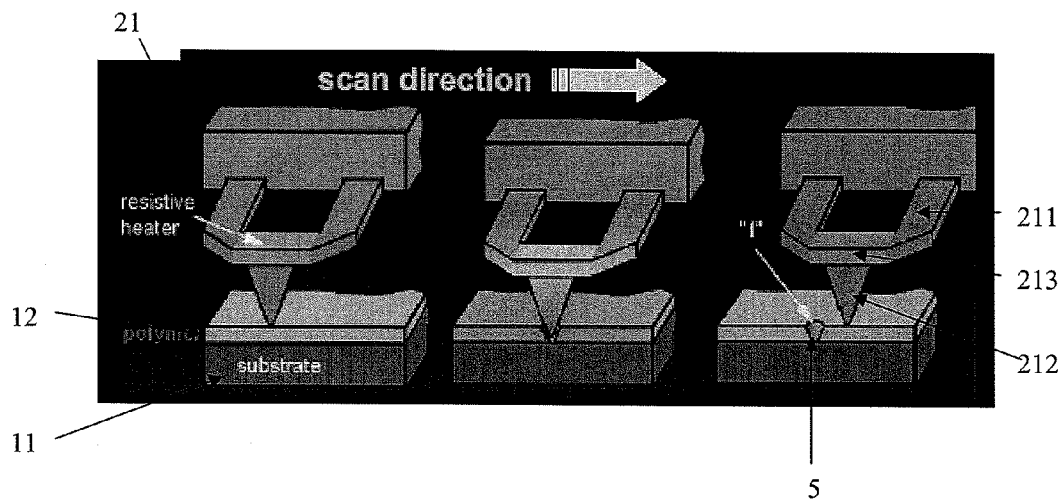
FIG. 3 illustrates writing of data by a probe.

FIG. 3 illustrates the thermo-mechanical writing of data by each probe 21. Each probe 21 comprises a spring cantilever 211 and a heater platform 213 mounted between the legs of spring cantilever 211. The heater platform 213 has a tip 212 mounted thereon. As the probe array 2 is moved by actuator 33 in the z direction and the probe tip 212 comes in contact with the surface of the storage medium 1, a force is applied by the spring cantilever 211. The probe 21 is scanned in the x direction by moving the storage medium in the x direction by actuator 31. Writing of a mark or pit 5 is achieved by applying a current or voltage pulse to the heater platform 213, which heats the tip 212 to a temperature sufficient to melt polymer layer 12 and form a mark 5 in the polymer layer, the mark having a conical shape corresponding to the shape of the tip 212.

Figure 4:
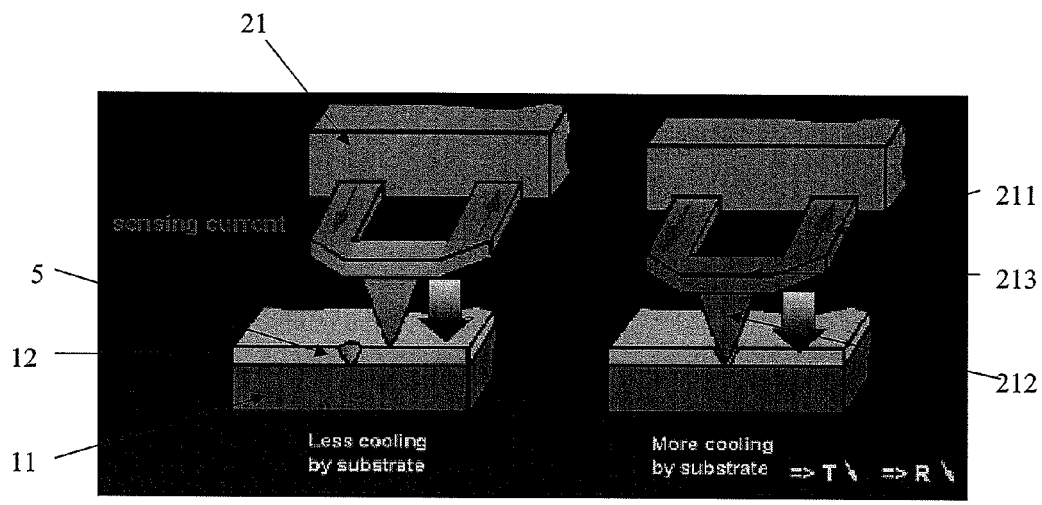
FIG. 4 illustrates reading of data by a probe.

FIG. 4 illustrates the reading of data from the storage medium 1. A sensing current is passed through the probe 21 to heat the heater platform 213 and hence the tip 212. The sensing current is such that the temperature to which the heater platform 213 and the tip 212 are heated is less than the temperature used for writing and specifically less than the temperature required to melt the polymer layer 12. As the tip 21 enters a mark 5, because of the conical surface of the tip 212 and the matching conical surface of the mark 5 there is an increased surface area of the tip 212 in contact with the polymer layer 12, which results in more heat transfer to the substrate and a drop in temperature of the tip 212 and heater platform 213. This causes a detectable drop in resistance, allowing the detection of the mark 5. In order to conserve power, preferably a pulsed sensing current is used such that the pulses only occur when the probe 21 is located in the centre of a mark (or, if no mark is present, where a mark would be recorded).

In both FIGS. 3 and 4, the cantilever 211 is illustratively shown as perpendicular to the scan direction, whereas actually the cantilever 211 is directed in the longitudinal direction ie parallel to the scan direction.

Figure 5:
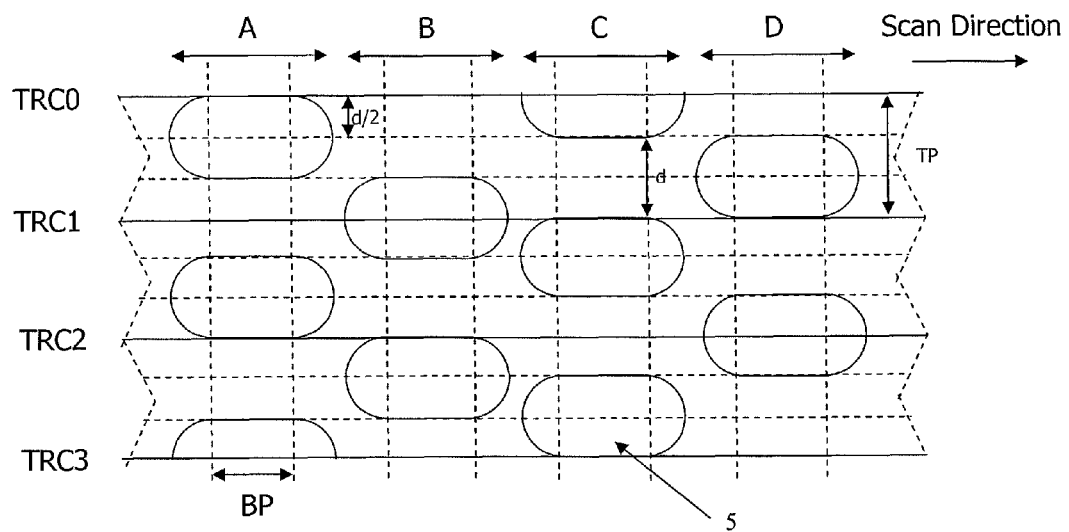
FIG. 5 illustrates an example of a servo mark pattern.
Figure 10:
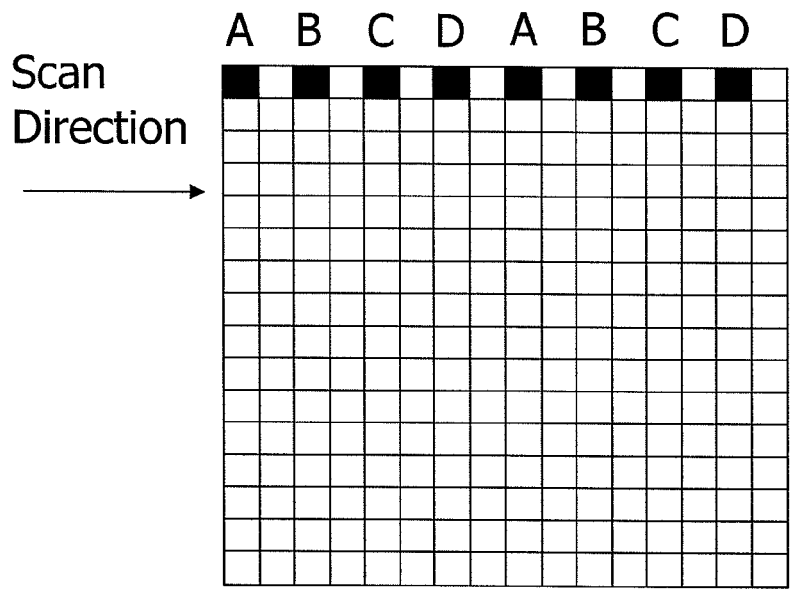
FIGS. 10 and 11 illustrate prior art arrangements of servo mark patterns.
Figure 11:
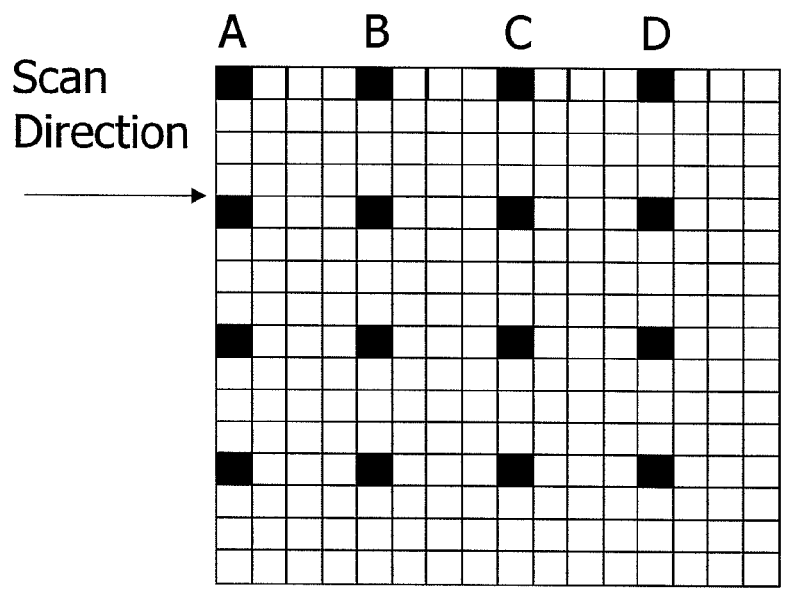
Figure 13:
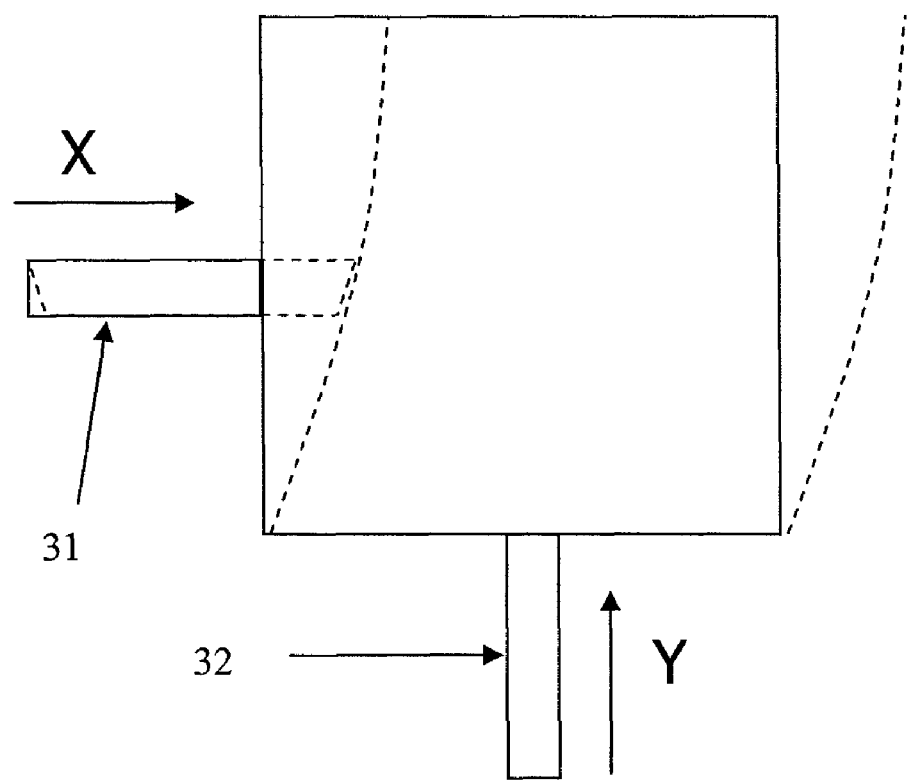
FIG. 13 illustrates distortion of the storage medium.

As well as the data which is stored in the storage medium 1, the storage medium 1 also has operational data fields 42 which include operational data, this data being required for scanning the storage medium 1. One type of operational data is servo marks, which are used for positioning the probes 21 during scanning and tracking of the probes 21 so that they read and/or write in the correct positions. An example of a servo mark pattern is shown in FIG. 5 and disclosed in US 2003/0218960. The servo mark pattern comprises a plurality of marks 5 and is made up of four different patterns A, B, C and D, wherein in each pattern A, B, C, D the marks 5 are aligned differently with respect to a central tracking line in the scan direction. Patterns A, B, C and D are preferably each recorded in separate operational data fields 42 so that the marks of patterns A, B, C and D can be read simultaneously by the probes 21 associated with the operational data fields. The arrangements of the operational data fields 42 on the storage medium 1 which are disclosed in US 2003/0218960 are shown in FIGS. 10 and 11. However, this leads to the problem that distortion of the storage medium 1 by the actuators 31, 32 as shown in FIG. 13 means that the servo marks may be missed or not read simultaneously by the probes 21 which are aligned to read the operational data.

Figure 6:
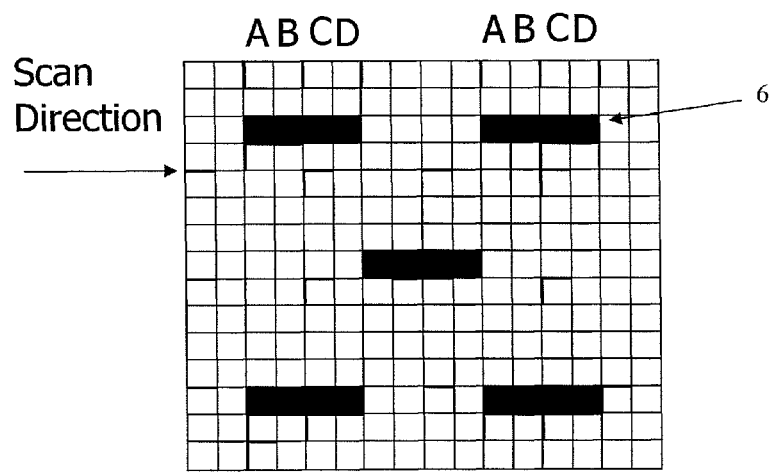
FIG. 6 illustrates an arrangement of servo mark patterns in accordance with a first embodiment of the present invention.

FIG. 6 illustrates an arrangement of servo marks in accordance with a first embodiment of the present invention. The operational data fields 42 which include the servo mark patterns are arranged in clusters 6 of adjacent data fields so that data fields including the different patterns A, B, C and D are located adjacent to each other. Thus they can be scanned simultaneously by adjacent probes 21 of the probe array 2. The clusters 6 are located with one cluster substantially in the geometrical centre of the storage medium 1 and four further clusters located in the geometrical corners of the storage medium 1.

Figure 9:
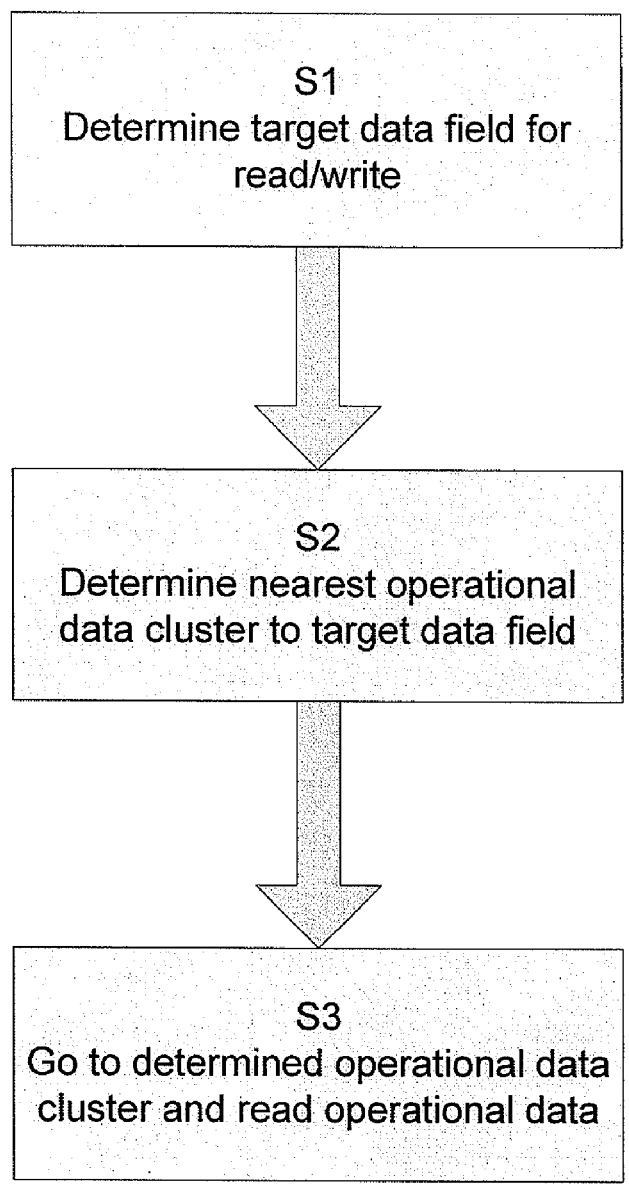
FIG. 9 is a flow diagram illustrating a method of scanning a storage medium in accordance with the present invention.

FIG. 9 is a flow chart illustrating a method of scanning a data storage medium 1 with the probe array 2. In step S1, a target data field, being a data field for reading/writing data is determined. In step S2, the nearest operational data cluster 6 to the target data field is determined and, in S3 the operational data from the selected data cluster 6 is read and used to control parameters of the scanning of the data storage medium 1 by the probe array 2.

More specifically, with respect to the use of servo marks as operational data, during a write operation, first a host sends a command to write data to the storage medium 1. The host then sets the data on a bus. A probe storage controller receives the data through interface and buffer units and calculates the data allocation and data segmentation using an LBA (logical block address) to PBA (physical block address) mapping table. The probe storage controller asks a servo controller for the last known good data block position and the last tracked position and concurrently the servo controller receives from the storage controller information about the target block location. Based on the target block location, the nearest servo mark cluster is selected. Before the actual jump from previous servo mark cluster to the target servo mark cluster, the necessary trajectory is projected using any known technique for trajectory planning (e.g. spline approximation, LMS polynomial fitting etc.). After the trajectory is calculated, the servo controller issues the control signal to the actuators which move the storage medium to the target data block location. If the target servo cluster is different from the last tracked one, servo controller opens the close-loop control to catch the target location servo mark. When the servo marks are detected, the servo controller closes the close loop control and provides the fine seek and track operations until the target data block is found. A "data block" is defined as a smaller area within a data field. Finally, the probe storage controller performs a write operation and updates the LBA to PBA and defect mapping table and the servo marks table of the servo controller.

With respect to the read operation, firstly the host sends a command to read data to the probe storage controller, which calculates the data location using the LBA to PBA mapping table. The probe storage controller asks the servo controller about the target location and the nearest corresponding servo mark cluster needed for positioning. Before the actual positioning, the necessary trajectory is projected using any known technique as discussed above. After the trajectory is calculated the servo controller issues the control signal to motor drivers which move the media to the target data block location. If the target servo cluster is different from the last tracked one, the servo controller opens the close-loop control to catch the target location servo mark. When the servo marks are detected, the servo controller closes the closed loop control and provides the find seek and track operations until the target data block is found. The probe storage controller then performs a read operation and adjusts the servo marks table of the servo controller when the read operation is complete.

Figure 7:
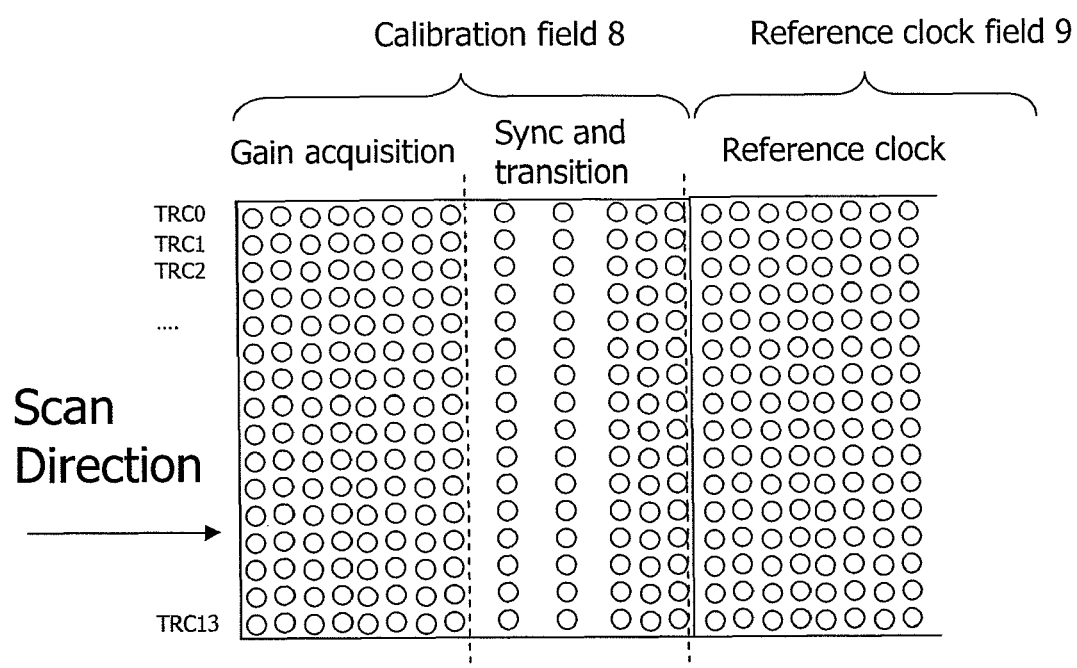
FIG. 7 illustrates an example of timing data including a calibration field and a reference clock field.
Figure 12:
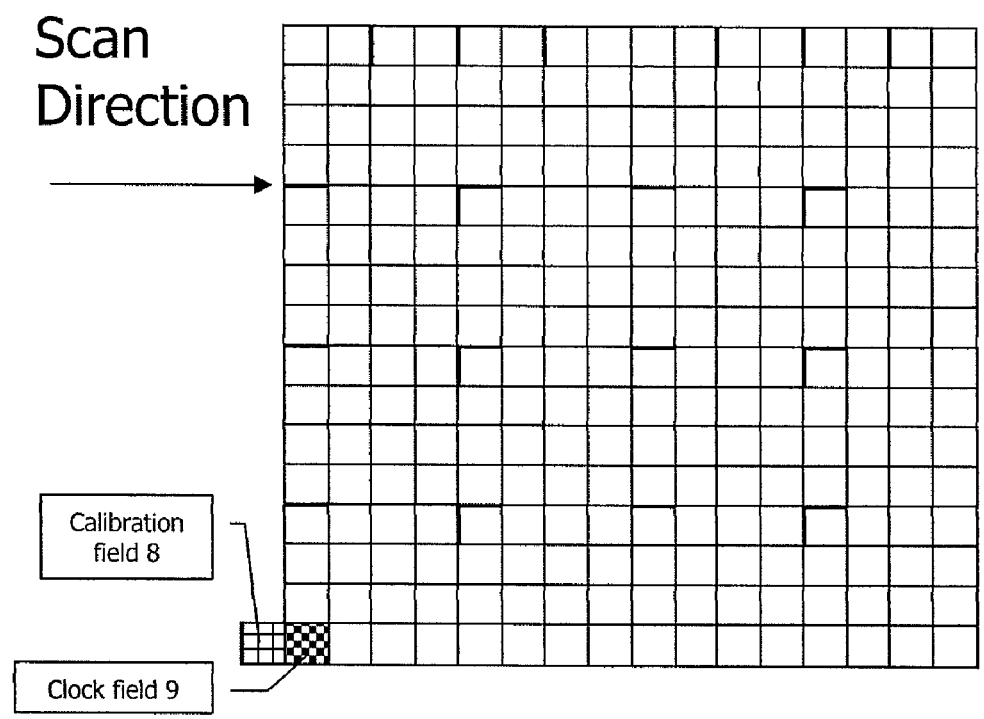
FIG. 12 illustrates a prior art arrangement of timing data.

Another type of operational data is timing data which is used to adjust the frequency and/or phase of the clock used to generate the pulses used to read/write data. FIG. 7 illustrates timing data as disclosed in US 2004/0047275. The timing data comprises a calibration field 8 and a reference clock field 9. These are written into two adjacent data fields. According to the arrangement of US 2004/0047275 and as shown in FIG. 12, in the prior art a single calibration and clock field have been located in one corner of the storage medium 1.

Figure 8:
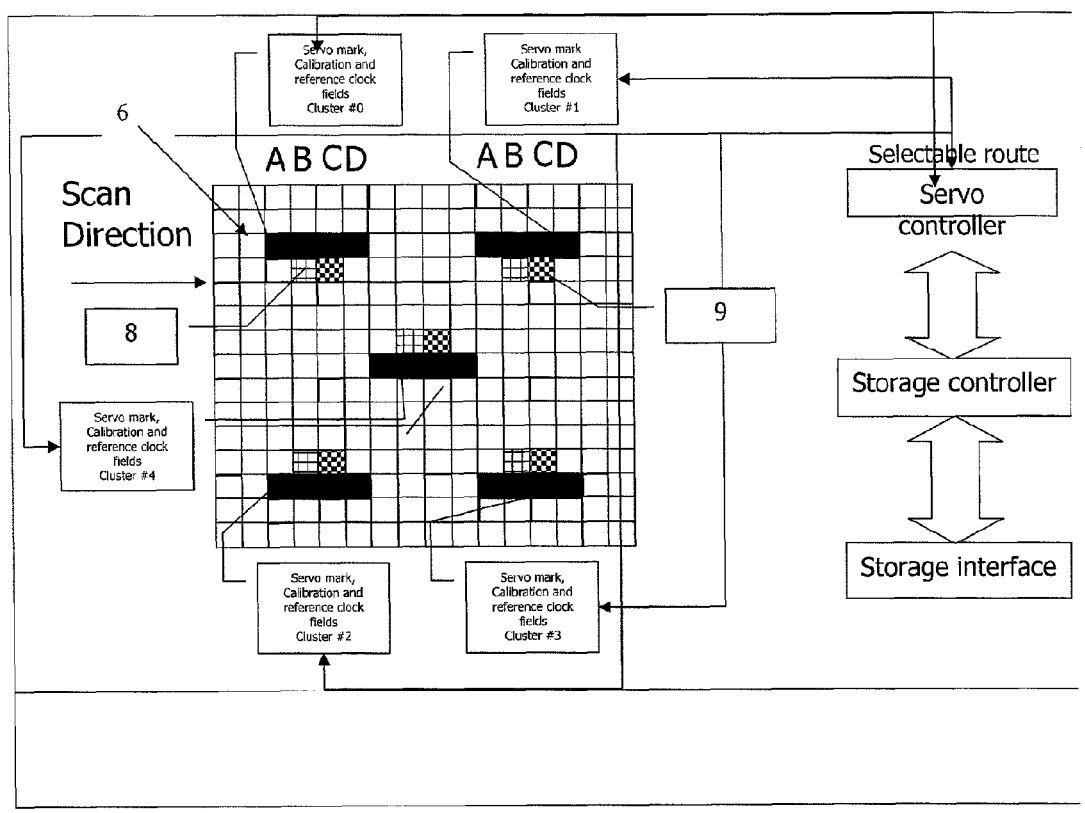
FIG. 8 illustrates an arrangement of timing data and servo data in accordance with a second embodiment of the present invention.

An arrangement according to a second embodiment of the present invention is shown in FIG. 8. The calibration field 8 and reference clock field 9 are located adjacent to the servo data fields A, B, C, D, to form clusters 6, each cluster 6 comprises one set of timing data and one set of servo data. The servo data fields are as described above with reference to the first embodiment, and are arranged in a row of the four different patterns A,B,C,D. The calibration field 8 and the reference clock field 9 are located in the adjacent row above or below the servo data fields. The clusters 6 are arranged on the storage medium 1 as in the first embodiment, wherein one cluster is located in the centre of the storage medium 1 and four clusters are located at corners of the storage medium 1.

During a read/write operation, as discussed above with respect to the first embodiment, first a target data block for read/write is determined and the nearest operational data cluster is determined. Then the storage medium is moved to the target location and the read/write operation is performed using the servo marks for tracking and the timing data to control the frequency/phase of the clock used to time the read/write pulses.

It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:

1. Apparatus for storing data in the form of marks, said marks being written and/or read by an array of probes, comprising: a plurality of data fields, each field comprising an area of the storage medium which, in use, is scanned for reading and/or writing by an associated one of the array of probes; wherein the data fields include operational data fields having operational data for operating said scanning stored therein; wherein the operational data fields are arranged in a plurality of clusters, each cluster comprising a plurality of adjacent operational data fields having operational data stored therein, wherein each cluster comprises two timing data fields, having a clock mark pattern and calibration data respectively stored therein, for adjusting a clock used to read/write data, at least one of which comprises a servo data field having servo data stored therein for determining positioning of the probe array during scanning, and at least one of which comprises a timing data field having timing data stored therein for determining timing of read and/or write pulses during scanning wherein the apparatus is a data storage medium.

2. Apparatus according to claim 1, wherein one of the clusters is located substantially in the geometric centre of the data storage medium.

3. Apparatus according to claim 1, wherein one of the clusters is located at each corner of the data storage medium.

4. Apparatus according to claim 1, wherein the operational data stored in each of the operational data fields in each cluster is different.

5. Apparatus according to claim 1, wherein the storage medium comprises a polymer surface and the marks are indentations.

6. Apparatus according to claim 1, wherein the reading/writing of the marks is performed thermomechanically.

7. Apparatus according to claim 1, wherein each probe exclusively scans one data field.

8. Apparatus according to claim 1, wherein each cluster comprises at least three operational data fields.

9. Apparatus according to claim 1, wherein each cluster comprises four different servo mark patterns, each stored in a different operational data field.

10. Apparatus comprising apparatus according to claim 1 and a probe array, wherein each probe in the array is configured to scan an associated one of the data fields for reading/writing data.

11. Apparatus according to claim 10, further comprising actuators for relatively moving the probe array and the storage medium in an x-y direction to perform scanning and optionally wherein the actuators are configured to move the storage medium relative to the probe array.

12. Apparatus according to claim 10, further comprising a controller configured to control the scanning operation in response to reading of the operational data and optionally wherein the controller is configured to control movement of the probe array in response to reading the servo data, and to control a clock used for providing a pulsed reading/writing signal in response to reading the timing data.

13. A method of scanning a data storage medium with a probe array comprising:
    determining a target data field out of a plurality of data fields on the data storage medium, wherein each data field is an area of the storage medium which is scanned by an associated probe of the probe array;

Selecting from a plurality of operational data clusters, an operational data cluster closest to the target data field, each operational data cluster comprising a plurality of adjacent data fields having operational data stored therein at least one of which comprises a servo data field having servo data stored therein, wherein each cluster comprises two timing data fields, having a clock mark pattern and calibration data respectively stored therein, for adjusting a clock used to read/write data, and at least one of which comprises a timing data field having timing data stored therein;

controlling positioning of die probe array during scanning using the servo data; and controlling timing of read and/or write pulses during scanning using the timing data.

14. Apparatus for storing data in the form of marks, said marks being written and/or read by an array of probes, comprising:

a plurality of data fields, each field comprising an area of the storage medium which, in use, is scanned for reading and/or writing by an associated one of the array of probes, wherein the data fields include operational data fields having operational data for operating said scanning stored therein;

wherein the operational data fields are arranged in a plurality of clusters, each cluster comprising a plurality of adjacent operational data fields, the operational data fields including a plurality of servo data fields wherein the operational data is servo data, and wherein each servo data field in a cluster comprises a different pattern of servo marks, which can be read simultaneously to perform a tracking operation, wherein the apparatus is a data storage medium.

15. Apparatus according to claim 14, wherein each cluster comprises at least four servo data fields, each comprising a different pattern of servo marks, which can be read simultaneously to perform a tracking operation.

16. Apparatus according to claim 14, wherein one of the clusters is located substantially in the geometric centre of the data storage medium and one of the clusters is located at each corner of the data storage medium.

17. Apparatus according to claim 14, wherein the storage medium comprises a polymer surface and the marks are indentations.

18. Apparatus according to claim 14, wherein the reading/writing of the marks is performed thermomechanically.

19. Apparatus according to claim 14, wherein each cluster further comprises two timing data fields comprising a clock mark pattern and calibration data respectively for adjusting a clock used to read/write data.

20. A data storage medium for storing data in the form of marks, said marks being written and/or read by an array of probes, comprising: a plurality of data fields, each field comprising an area of the storage medium which, in use, is scanned for reading and/or writing by an associated one of the array of probes; wherein the data fields include operational data fields having operational data for operating said scanning stored therein; wherein the operational data fields are arranged in a plurality of clusters, each cluster comprising a plurality of adjacent operational data fields having operational data stored therein, at least one of which comprises a servo data field having servo data stored therein for determining positioning of the probe array during scanning, and at least one of which comprises a timing data field having timing data stored therein for determining timing of read and/or write pulses during scanning, and wherein each cluster comprises at least four servo data fields.

21. A method of scanning a data storage medium with a probe array comprising:

determining a target data field out of a plurality of data fields on the data storage medium, wherein each data field is an area of the storage medium which is scanned by an associated probe of the probe array;

selecting from a plurality of operational data clusters, an operational data cluster closest to the target data field, each operational data cluster comprising a plurality of adjacent data fields having operational data stored therein at least one of which comprises a servo data field having servo data stored therein, and at least one of which comprises a timing data field having timing data stored therein, and wherein each cluster comprises at least four servo data fields;

controlling positioning of die probe array during scanning using the servo data; and controlling timing of read and/or write pulses during scanning using the timing data.

* * * * *